United States Patent [19]
Mafoti et al.

[11] Patent Number: 5,464,920
[45] Date of Patent: Nov. 7, 1995

[54] CAST ELASTOMERS PREPARED FROM AMINOCROTONATES

[75] Inventors: Robson Mafoti, Pittsburgh; Alan D. Bushmire, Bridgeville, both of Pa.

[73] Assignee: Bayer Corporation, Pittsburgh, Pa.

[21] Appl. No.: 349,859

[22] Filed: Dec. 6, 1994

Related U.S. Application Data

[63] Continuation-in-part of Ser. No. 270,567, Jul. 5, 1994, abandoned.

[51] Int. Cl.⁶ .......................... C08G 18/10; C08G 18/30
[52] U.S. Cl. ................... 528/60; 528/77; 528/78; 264/165
[58] Field of Search ................ 264/165; 528/60, 528/78, 77

[56] References Cited

U.S. PATENT DOCUMENTS

| | | | |
|---|---|---|---|
| 3,666,726 | 5/1972 | Grogler et al. | 260/77.5 CH |
| 5,066,824 | 11/1991 | Mafoti et al. | 560/44 |
| 5,151,470 | 9/1992 | Sanders et al. | 525/407 |
| 5,231,217 | 7/1993 | Yeater et al. | 560/44 |
| 5,302,303 | 4/1994 | Clatty et al. | 252/6.5 |
| 5,356,946 | 10/1994 | Mafoti et al. | 521/163 |

OTHER PUBLICATIONS

A. Awater, "PU cast elastomers" in Polyurethane Handbook, ed G. Oertel (New York: Hanser Publishers, 1985), pp. 372–388.

J. H. Saunders and K. C. Frisch, "Urethane Elastomers" in Polyurethanes Chemistry and Technology (New York: Interscience Publishers, 1962), pp. 273–314.

*Primary Examiner*—Frederick Krass
*Attorney, Agent, or Firm*—Joseph C. Gil; Richard E. L. Henderson

[57] ABSTRACT

This invention relates to a process for the preparation of cast elastomers comprising reacting in an open mold at an isocyanate index of about 90 to about 110

(a) an organic polyisocyanate;
(b) an aminocrotonate-terminated polyether having a molecular weight of from about 1200 to about 6500 and having the formula

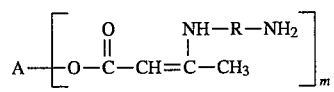

wherein A is the m-functional group left by the removal of the hydroxyl groups of a polyether polyol having a number average molecular weight of from 1000 to 6000, R is the difunctional residue of certain aromatic diamines having the formula $H_2N—R—NH_2$ such that each free $—NH_2$ group of the aminocrotonate-terminated polyether has a moderated reactivity toward the organic polyisocyanate, as indicated by a gel time of about 60 to about 300 seconds (measured at 90°–110° C. in the absence of a slower reacting chain extender or crosslinker), and m is a number of from 2 to 8; and (c) a chain extending agent having a molecular weight of from 62 to 400, optionally in admixture with 0 to about 30% by weight, relative to the chain extending agent, of a crosslinking agent having a molecular weight of from 300 to about 500.

8 Claims, No Drawings

CAST ELASTOMERS PREPARED FROM AMINOCROTONATES

This application is a continuation-in-part of application Ser. No. 270,567 filed Jul. 5, 1994, now abandoned.

BACKGROUND OF THE INVENTION

This invention relates to the preparation of cast elastomers by reaction of organic polyisocyanates with aminocrotonate-terminated polyethers containing isocyanate-reactive amino groups having moderated reactivity.

Aminocrotonate-terminated polyethers are known. E.g., U.S. Pat. Nos. 3,666,726, 5,066,824, 5,151,470, and 5,231,217. The casting of polyurethane elastomers in open molds is also known. E.g., A. Awater, "PU cast elastomers" in *Polyurethane Handbook*, ed. G. Oertel (New York: Hanser Publishers, 1985), pages 372–388; J. H. Saunders and K. C. Frisch, "Urethane Elastomers" in *Polyurethanes. Chemistry and Technology* (New York: Interscience Publishers, 1962), pages 273–314. However, aminocrotonate-terminated polyethers have most typically been used for reaction injection molding, in which relatively rapid reaction of isocyanate components with isocyanate-reactive components is desired. E.g., U.S. Pat. No. 5,356,946 and U.S. application Ser. No. 07/699,529 (filed May 14, 1991). Such reactivities are not generally considered suitable for preparing cast elastomers in open molds.

It has now been found, however, that cast elastomers having good mechanical properties can be prepared using aminocrotonate-terminated polyethers containing amino groups having reduced reactivity toward organic polyisocyanates.

SUMMARY OF THE INVENTION

This invention relates to a process for the preparation of cast elastomers comprising reacting in an open mold at an isocyanate index of about 90 to about 110

(a) an organic polyisocyanate;

(b) an aminocrotonate-terminated polyether having a number average molecular weight of from about 1200 to about 6500 and having the formula

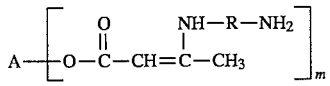

wherein

A is the m-functional group left by the removal of the hydroxyl groups of a polyether polyol having a number average molecular weight of from 1000 to 6000, R is the difunctional residue of an organic diamine having the formula $H_2N-R-NH_2$ wherein said organic diamine is (1) a substituted aromatic diamine in which one or more aromatic ring substituents are situated ortho to the amino groups that give rise to the $-NH_2$ groups of the aminocrotonate-terminated polyethers, or (2) an aromatic diamine other than diamine (b)(1) in which the reduced reactivity of the amino groups giving rise to the $-NH_2$ groups of the aminocrotonate-terminated polyethers is due primarily to electronic effects rather than steric factors, such that each free $-NH_2$ group of the aminocrotonate-terminated polyether has a sufficiently moderated reactivity toward the organic polyisocyanate, as indicated by a gel time of about 60 to about 300 seconds (measured at 90°–110° C. in the absence of a slower reacting chain extender or crosslinker), to allow the preparation of an elastomer in an open mold, and m is a number of from 2 to 8; and (c) a chain extending agent having a molecular weight of from 62 to about 400, optionally in admixture with 0 to about 30% by weight (preferably 5 to 25% by weight), relative to the chain extending agent, of a crosslinking agent having a molecular weight of from 300 to about 500;

optionally in the presence of (d) one or more auxiliaries and/or additives.

DETAILED DESCRIPTION OF THE INVENTION

Suitable organic polyisocyanates (a) include aliphatic, cyclo-aliphatic, araliphatic, aromatic, and heterocyclic polyisocyanates of the type described, for example, by W. Siefken in *Justus Liebigs Annalen der Chemie*, 562, pages 75 to 136. Such isocyanates include those having the formula $$Q(NCO)_n$$

in which n is a number from 2 to about 5 (preferably 2 to 3) and Q is an aliphatic hydrocarbon group containing 2 to about 18 (preferably 6 to 10) carbon atoms, a cycloaliphatic hydrocarbon group containing 4 to about (preferably 5 to 10) carbon atoms, an araliphatic hydrocarbon group containing 8 to 15 (preferably 8 to 13) carbon atoms, or an aromatic hydrocarbon group containing 6 to about 15 (preferably 6 to 13) carbon atoms. Examples of suitable isocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatomethylcyclohexane ("isophorone diisocyanate"; see, e.g. German Auslegeschrift 1,202,785 and U.S. Pat. No. 3,401,190); 2,4- and 2,6-hexahydrotoluene diisocyanate and mixtures of these isomers; dicyclohexylmethane-4,4'-diisocyanate ("hydrogenated MDI", or "HMDI"); 1,3- and 1,4-phenylene diisocyanate; 2,4- and 2,6-toluene diisocyanate and mixtures of these isomers ("TDI"); diphenylmethane-2,4'- and/or -4,4'-diisocyanate ("MDI"); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation ("crude MDI"), which are described, for example, in British Pat. Nos. 878,430 and 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing urethane groups of the type described, for example, in U.S. Pat. Nos. 3,394,164 and 3,644,457; modified polyisocyanates containing allophanate groups of the type described, for example, in British Pat. No. 994,890, Belgian Pat. No. 761,616, and published Dutch Pat. No. Application 7,102,524; modified polyisocyanates containing isocyanurate groups of the type described, for example, in U.S. Pat. No. 3,002,973, German Patentschriften 1,022,789, 1,222,067 and 1,027,394, and German Offenlegungsschriften 1,919,034 and 2,004,048; modified polyisocyanates containing urea groups of the type described in German Patentschrift 1,230,778; polyisocyanates containing biuret groups of the type described, for example, in German Patenschrift 1,101,394, U.S. Pat. Nos. 3,124,605 and 3,201,372, and in British Pat. No. 889,050; polyisocyanates obtained by telomerization reactions of the type described, for example, in U.S. Pat. No. 3,654,106; polyisocyanates containing ester groups of the type described, for example, in British Pat. Nos. 965,474 and 1,072,956, in U.S. Pat. No. 3,567,763, and in German Patentschrift 1,231,688; reaction products of the above-mentioned isocyanates with acetals as described in German Patentschrift 1,072,385; and polyisocyanates containing polymeric fatty acid groups of the type described in U.S. Pat. No. 3,455,883. It is also possible to use the isocyanate-containing distillation residues that accumulate in the production of isocyanates on a commercial scale, optionally in solution in one or more of the polyisocyanates mentioned above. It is also possible to use mixtures of the polyisocyanates described above.

It is generally preferred to use readily available polyisocyanates, such as 2,4- and 2,6-toluene diisocyanates and mixtures of these isomers ("TDI"); polyphenyl-polymethylene-polyisocyanates of the type obtained by condensing aniline with formaldehyde, followed by phosgenation ("crude MDI"); and polyisocyanates containing carbodiimide groups, urethane groups, allophanate groups, isocyanurate groups, urea groups, or biuret groups ("modified polyisocyanates").

Aminocrotonate-terminated polyethers (b) can be prepared by known methods from acetoacetate-modified polyether precursors, which can in turn be prepared by known methods from suitable polyether polyols. E.g., U.S. Pat. Nos. 3,666,726, 3,691,112, 5,066,824, 5,151,470, 5,231,217, and 5,356,946; see also U.S. application Ser. No. 07/699,529 (filed May 14, 1991). Suitable hydroxyl-containing polyethers for the preparation of the acetoacetate-modified polyether precursors are known and may be prepared, for example, by the polymerization of epoxides such as ethylene oxide, propylene oxide, butylene oxide, tetrahydrofuran, styrene oxide, or epichlorohydrin, optionally in the presence of $BF_3$, or by chemical addition of such epoxides, optionally as mixtures or successively, to starting components containing reactive hydrogen atoms, such as water, alcohols, or amines. Examples of such starting components include ethylene glycol, 1,2-or 1,3-propanediol, 1,2-, 1,3-, or 1,4-butanediol, trimethylolpropane, 4,4'-dihydroxydiphenylpropane, aniline, ammonia, ethanolamine, or ethylene diamine. Sucrose polyethers of the type described, for example, in German Auslegeschriften 1,176,358 and 1,064,938 may also be used according to the invention. Polyethers that contain predominantly primary hydroxyl groups (up to about 90% by weight, based on all of the hydroxyl groups in the polyether) are also often preferred. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patentschrift 1,152,536) are also suitable, as are polybutadienes containing hydroxyl groups. Particularly preferred polyethers include polyoxyalkylene polyether polyols, such as polyoxyethylene diol, polyoxypropylene diol, polyoxybutylene diol, and polytetramethylene diol. Corresponding polythioethers, although generally less preferred, are also suitable.

Acetoacetylation of such polyether polyols gives acetoacetate-modified polyether precursors having the general formula

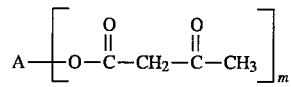

wherein A is the m-functional group left by the removal of the hydroxyl groups of a polyether polyol having a number average molecular weight of from about 1000 to about 6000, and m is a number of from 2 to 8 (preferably 2 or 3, more preferably 2). Acetoacetylation is preferably carried out by transesterifying the polyols described above with at least a molar equivalent of a $C_1$–$C_6$ alkyl acetoacetate, such as methyl acetoacetate, ethyl acetoacetate, propyl acetoacetate, and, preferably, t-butyl acetoacetate, preferably in the presence of a transesterification catalyst.

The acetoacetate-modified polyether precursors are converted to aminocrotonate-terminated polyethers of this invention by reaction with suitable diamines having the formula $H_2N$—R—$NH_2$, optionally in the presence of a suitable acid catalyst. Suitable diamines have one amino group that reacts with the acetoacetate-modified polyether precursor and a second amino group that, after the aminocrotonate-terminated polyether is formed, exhibits a reactivity toward organic polyisocyanates that is sufficiently attenuated to allow the preparation of cast elastomers in an open mold. Such attenuated reactivity is reflected by gel times falling within a specific range of about 60 to about 300 seconds measured at 90°–110° C. Because the isocyanate polyaddition reaction can also be retarded when using a chain extender or crosslinker having a lower reactivity than aminocrotonate-terminated polyethers (for example, hydroxyl-containing or hindered-amine-containing chain extenders and crosslinkers), gel times are measured in the absence of such lower reactivity compounds. In addition, the gel times are measured in the absence of solvent (i.e., "neat gel times"). Aminocrotonate-terminated polyethers having gel times outside the specified range are unsuitable for preparing cast elastomers.

The amino group that reacts initially with the acetoacetate-modified polyether precursor need not have attenuated reactivity, but if it does exhibit attenuated reactivity, a catalyst is generally used. Reactivities of the attenuated-reactivity amino groups can be moderated by either steric effects or electronic effects. Examples of suitable diamines $H_2N$—R—$NH_2$ in which reactivity is determined primarily by steric effects include substituted aromatic diamines in which one or more aromatic ring substituents (preferably $C_1$–$C_6$ alkyl groups) are situated ortho to the amino groups that give rise to reactive amino groups of the aminocrotonate-terminated polyethers, such as 1-methyl-3,5-bis(methylthio)-2,4- and/or-2,6-diaminobenzene, 1,3,5-triethyl-2,4-diaminobenzene, 1,3,5-triisopropyl-2,4-diaminobenzene, 1-methyl-3,5-diethyl-2,4- and/or-2,6-diaminobenzene ("DETDA"), 4,6-dimethyl-2-ethyl-1,3-diaminobenzene, 3,5,3',5'-tetraethyl-4,4-diaminodiphenylmethane, 3,5,3',5'-tetraisopropyl-4,4'-diaminodiphenylmethane, and 3,5-diethyl-3',5'-diisopropyl-4,4'-diaminodiphenylmethane.

Examples of diamines $H_2N$—R—$NH_2$ in which reactivity is determined primarily by electronic effects rather than steric factors include aromatic diamines containing deactivating substituents, such as halogenated diaminodiphenylmethanes (for example, 3,3'-dichloro-4,4'-diaminodiphenylmethane ("MOCA") and 3-chloro-4,4'-diaminodiphenylmethane (in which the amino group attached to the chlorinated aromatic ring is left exposed)), and 4-(4'-aminobenzyl)cyclohexylamine ("½ PACM") (in which the non-aromatic amino group reacts preferentially with the acetoacetate group and the less reactive aromatic amino group is left exposed).

Suitable acidic catalysts for the preparation of the aminocrotonate-terminated polyethers from the corresponding acetoacetate-modified polyether precursors, if used at all, include boron trifluoride etherate and organic acids having $pK_a$ values of from 0.1 to 0.8, such as trifluoroacetic acid and p-toluenesulfonic acid. Although solvents are not essential for the preparation of at least some aminocrotonate-terminated polyethers, solvents are generally preferred, especially solvents that form azeotropes with water. Suitable solvents include dichloromethane, chloroform, chlorobenzene, dichlorobenzenes, toluene, xylenes, ethyl acetate, propyl acetate, butyl acetate, diethyl ether, dibutyl ether, and the like.

Suitable chain-extending agents (c) include compounds having two isocyanate-reactive hydrogen atoms and having a molecular weight of from 32 to 399. Such compounds contain hydroxyl groups, amino groups, thiol groups, and/or carboxyl groups. Although hydroxyl-containing chain extenders can be used, chain extenders containing amino groups are preferred. The preferred amine chain extenders contain exclusively aromatically bound primary or secondary (preferably primary) amino groups and preferably also contain alkyl substituents. Examples of such diamines include 1,4-diaminobenzene, 2,4-diaminotoluene, 2,4'- and/ or 4,4'-diaminodiphenylmethane, 3,3'-dimethyl-4,4'-diaminodiphenylmethane, 1-methyl-3,5-bis(methylthio)-2,4- and/ or-2,6-diaminobenzene, 1,3,5-triethyl-2,4-diaminobenzene, 1,3,5-triisopropyl-2,4-diaminobenzene, 1-methyl-3,5-diethyl-2,4- and/or -2,6-diaminobenzene, 4,6-dimethyl-2-ethyl-1,3-diaminobenzene, 3,5,3',5'-tetraethyl-4,4-diaminodiphenylmethane, 3,5,3',5'-tetraisopropyl-4,4'-diaminodiphenylmethane, and 3,5-diethyl-3',5' -diisopropyl-4,4'-diaminodiphenylmethane. Such diamines may, of course, also be used as mixtures. It is particularly preferred to use 1-methyl-3,5-diethyl-2,4-diaminobenzene or a mixture of this compound with 1-methyl-3,5-diethyl-2,6-diaminobenzene. It also possible to use aminocrotonate-terminated polyethers having the specified molecular weight range as a chain extender.

The less-preferred hydroxyl-containing chain extenders include glycols and polyols, such as 1,2-ethanediol, 1,2- and 1,3-propylene glycol, 1,4-and 2,3-butylene glycol, 1,6-hexanediol, 1,8-octanediol, neopentyl glycol, cyclohexanedimethanol, 1-methyl-1,3-propanediol, and 2-methyl-1,3-propanediol.

It is also possible to include 0 to about 30% by weight (preferably 5 to 25% by weight), relative to the chain extender, of crosslinking agents known in the art. Suitable crosslinking agents contain amino groups, hydroxyl groups, and/or thiol groups and generally contain 3 to 8 (preferably 3 or 4) isocyanate-reactive hydrogen atoms and have a molecular weight of from about 300 to about 500. It is generally preferred to use crosslinkers containing hydroxyl groups, such as glycerol, trimethylolpropane, 1,2,6-hexanetriol, 1,2,4-butanetriol, and trimethylolethane. A particularly preferred crosslinker is an ethylene-diamine started polyether of propylene oxide having a number average molecular weight of about 356.

Auxiliary agents and/or additives may optionally also be used in the process of the invention. Suitable auxiliary agents and/or additives (d) may include, for example, internal mold release agents, catalysts for the polyisocyanate-polyaddition reaction, blowing agents, surface-active additives, cell regulators, pigments, dyes, UV stabilizers, plasticizer, fungistatic or bacteriostatic substances, and fillers and/or reinforcing substances, such as those described in European Pat. No. Application 81,701 at column 6, line 40, to column 9, line 31. Suitable fillers and/or reinforcing substances, if used at all, include barium sulfate, kieselguhr, whiting, mica, and especially glass fibers, liquid crystal fibers, glass flakes, glass balls, aramide fibers, and carbon fibers, which may be added in quantities of up to 80% by weight (preferably up to 30% by weight) based on the total quantity of filled or reinforced elastomer. Catalysts, although generally not necessary, are often desirable in the process of the invention. Suitable catalysts include tertiary amines and organic metal compounds (especially organic tin compounds) known in the art and are generally used in a quantity ranging from about 0.001 to about 10% by weight, based on the quantity of organic polyisocyanate.

The process of the invention can be carried out using a one-stage, a prepolymer, or a semiprepolymer process. In the one-stage (or "one-shot") method, the isocyanate-reactive components, as well as any catalyst and/or optional additives and auxiliaries, are typically combined and thoroughly blended in a premix. The organic polyisocyanate is then mixed with the premix in an appropriate open mold. Suitable mold materials include metals (for example, aluminum) or plastics (for example, epoxide resin). External release agents, such as silicone oils, are often used during the molding process. It is, however, also possible to use so-called "internal release agents", optionally in admixture with external release agents, as described, for example, in German Oftenlegungsschriften 2,121,670 and 2,307,589.

In the prepolymer method, a prepolymer is formed by reacting the polyisocyanate with a portion of the isocyanate-reactive components. It is possible, although less preferred, to mix a portion of an aminocrotonate-terminated polyether with other isocyanate-reactive compounds as long as the specified amount is always used as the chain extender. The prepolymer is then mixed with the remainder of the isocyanate-reactive components and allowed to react in a suitable open mold.

The less preferred semiprepolymer method is similar to the prepolymer method except that a portion of the organic polyisocyanate remains unreacted. That is, the isocyanate component is a mixture of unreacted polyisocyanate and true prepolymer. As in the prepolymer method, the semiprepolymer is allowed to react with the remainder of the isocyanate-reactive components to form the elastomer product.

When carrying out the process of the present invention, the quantity of polyisocyanate prepolymer should preferably be such that the isocyanate index is from about 90 to about 110, preferably 100 to 105. By "isocyanate index" is meant the quotient of the number of isocyanate groups divided by the number of isocyanate-reactive groups, multiplied by 100.

The in-mold reaction is generally carried out in heated mold at a temperature of about 80° C. to about 130° C. (preferably 90° C. to 110° C.). After the polymer-forming reaction is complete, the resultant elastomers are post-cured, typically at a temperature of about 90° C. to about 120° C. Gel times of about 60 to about 300 seconds (measured at 90°–110° C. in the absence of a slower reacting chain extender or crosslinker) are characteristic of the reaction mixtures according to the present invention.

The elastomers prepared according to the present invention can be used in cast elastomer applications known in the art where good mechanical properties are necessary or desirable, such as load wheels, roller skate wheels, gaskets for drilling equipment, conveyor belts, and the like.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Handcasting Procedure

The following starting materials were used for handcasting experiments.

| | Isocyanate-reactive components: |
|---|---|
| Amino-crotonate A | A polyoxypropylene glycol having a molecular weight of about 2000 (available as MULTRANOL ® M-3600 from Miles Inc.) was acetoacetylated with t-butyl acetoacetate at 160° C. for eight hours and then aminated with an aromatic diamine mixture containing 80% by weight of 1-methyl-3,5-diethyl-2,4-diaminobenzene and 20% by weight of 1-methyl-3,5-diethyl-2,6-diaminobenzene ("DETDA") at 115° C. for eight hours |
| Amino-crotonate B | A polyoxypropylene glycol having a molecular weight of about 2000 (MULTRANOL ® M-3600) was acetoacetylated with t-butyl acetoacetate at 160° C. for eight hours and then aminated with 4-(4'-aminobenzyl)-cyclohexylamine ("½ PACM") at 115° C. for eight hours |
| Amino-crotonate C | A comparison polyoxypropylene glycol having a molecular weight of about 2000 (MULTRANOL ® M-3600) was acetoacetylated with t-butyl acetoacetate at 160° C. for eight hours and then aminated with 2-methylpentamethylenediamine (available as DYTEK ® A from DuPont) at 115° C. for eight hours |
| Polyol A | A polytetramethylene glycol having a molecular weight of 2000 (available as TERATHANE ® 2000 from DuPont) |
| Extender A | N,N'-dialkyl-p-phenylenediamine (a hindered aromatic amine available as UNILINK ® 4100 from UOP Inc.) |
| Extender B | N,N'-dialkylaminodiphenylmethane (a hindered aromatic amine available as UNILINK ® 4200 from UOP Inc.) |
| Extender C | 1,4-Butanediol |
| Extender D | Ethylenediamine-started polyether of propylene oxide having a hydroxyl number of 630 and a functionality of 4 (i.e., an amine crosslinker) |
| | Isocyanate components: |
| NCO prepolymer | MDI-terminated prepolymer based on a polytetramethylene glycol polyether having a molecular weight of 2000 (available as BAYTEC ® ME-090 from Miles |

| | -continued |
|---|---|
| | Inc.) |

A half-liter container was charged with a mixture of the aminocrotonate, the aromatic amine, and other isocyanate-reactive components in the quantities shown in Tables 1 and 2. A second half-liter container was charged with the prepolymer. The containers were evacuated in an oven at 90° C. for one hour. The starting materials were removed from the oven and allowed to cool to 60° C. The contents of the containers were mixed in a container equipped with an air-driven stirrer, with care being taken to avoid the introduction of bubbles while at the same time acting quickly so the mixture did not set in the container. Mixing time was approximately ten seconds. A 4-millimeter thick rectangular mold and a compression set button mold were treated with a silicone mold release agent and then placed in an oven heated at 110° C. The reaction mixture was poured into the molds and bubbles were removed by passing a propane torch over the surface. The plaque mold was closed and secured with a clamp. Both molds were placed in an oven and heated at 110° C. for one hour. The resultant parts were carefully removed and allowed to cool on a flat surface. Examples 1(c), 6(c), and 7(c) (Table 1) and Examples 12(c), 13(c), 16(c), 17(c), and 20(c) (Table 2) are comparison examples.

Postcuring Procedure

Prior to postcuring, small samples of each part were tested for softening temperature by thermal mechanical analysis ("TMA") using a Perkin-Elmer TMS-2 instrument fitted with a hemispherical quartz probe of radius 0.48 mm (at a load on the probe of 100 g and a heating rate of 10° C./min under a 20 ml/min helium purge, the softening point being the temperature at which the probe penetrated the sample by 0.1 mm). The panels were then postcured at 15° C. below the predetermined softening point. A vacuum oven was heated at the appropriate temperature. The parts were placed in the oven, the oven was evacuated, and the parts were heated in vacuo for four hours. The parts were then removed and allowed to cool on a flat surface.

Postcure data are shown in Tables 1 and 2. Physical properties are shown in Tables 3 and 4. Examples 1(c), 6(c), and 7(c) (Table 1) and Examples 12(c), 13(c), 16(c), 17(c), and 20(c) (Table 2) are comparison examples.

TABLE 1

Compositions and postcure data for Examples 1–11

| | Example | | | | | | | | | | |
|---|---|---|---|---|---|---|---|---|---|---|---|
| | 1(c) | 2 | 3 | 4 | 5 | 6(c) | 7(c) | 8 | 9 | 10 | 11 |
| Isocyanate-reactive components (1) | | | | | | | | | | | |
| Aminocrotonate A | — | 80.0 | — | 80.0 | — | — | — | 80.0 | — | 80.0 | — |

TABLE 1-continued

Compositions and postcure data for Examples 1–11

| | Example | | | | | | | | | | |
|---|---|---|---|---|---|---|---|---|---|---|---|
| | 1(c) | 2 | 3 | 4 | 5 | 6(c) | 7(c) | 8 | 9 | 10 | 11 |
| Aminocrotonate B | — | — | 80.0 | — | 80.0 | — | — | — | 80.0 | — | 80.0 |
| Aminocrotonate C | — | — | — | — | — | 80.0 | — | — | — | — | — |
| Extender A | 24.4 | 20.0 | 20.0 | 16.0 | 16.0 | 16.0 | — | — | — | — | — |
| Extender B | — | — | — | — | — | — | 20.0 | 20.0 | 20.0 | 16.0 | 16.0 |
| Extender D | — | — | — | 4.0 | 4.0 | 4.0 | — | — | — | 4.0 | 4.0 |
| Isocyanate component (1) | | | | | | | | | | | |
| NCO prepolymer A | 100.0 | 121.2 | 120.7 | 125.4 | 124.9 | 125.4 | 100.0 | 89.4 | 89.0 | 104.7 | 104.2 |
| NCO index | 105 | 105 | 105 | 105 | 105 | 105 | 105 | 105 | 105 | 105 | 105 |
| Postcure data | 120 | 130 | 126 | 154 | 147 | 140 | 122 | 115 | 133 | 170 | 164 |
| Postcure temp. (°C.) | | | | | | | | | | | |
| Gel time data | >1000 | 61 | 64 | 115 | 85 | 35 | 600 | 190 | 187 | 195 | 185 |
| Gel times (sec) | | | | | | | | | | | |

(1) Quantities are given in parts by weight.

TABLE 2

Compositions and postcure data for Examples 12–20

| | Example | | | | | | | | |
|---|---|---|---|---|---|---|---|---|---|
| | 12(c) | 13(c) | 14 | 15 | 16(c) | 17(c) | 18 | 19 | 20(c) |
| Isocyanate-reactive components (1) | | | | | | | | | |
| Aminocrotonate A | — | — | 80.0 | — | — | — | 80.0 | — | — |
| Aminocrotonate B | — | — | — | 80.0 | — | — | — | 80.0 | — |
| Aminocrotonate C | — | — | — | — | 80.0 | — | — | — | 80.0 |
| Polyol A | — | 80.0 | — | — | — | 80.0 | — | — | — |
| Extender C | 20.0 | 20.0 | 20.0 | 20.0 | 20.0 | 16.0 | 16.0 | 16.0 | 16.0 |
| Extender D | — | — | — | — | — | 4.0 | 4.0 | 4.0 | 4.0 |
| Isocyanate component (1) | | | | | | | | | |
| NCO prepolymer | 200.0 | 236.4 | 230.0 | 229.4 | 230.7 | 216.6 | 210.4 | 209.6 | 210.9 |
| NCO index | 105 | 105 | 105 | 105 | 105 | 105 | 105 | 105 | 105 |
| Postcure data | 182 | 139 | 147 | 165 | 158 | 122 | 170 | 140 | 170 |
| Postcure temp. (°C.) | | | | | | | | | |
| Gel time data | 300 | 450 | 275 | 250 | 123 | 429 | 283 | 254 | 118 |
| Gel times (sec) | | | | | | | | | |

(1) Quantities are given in parts by weight.

TABLE 3

Physical properties of elastomers prepared in Examples 1–11

| | Example | | | | | | | | | | |
|---|---|---|---|---|---|---|---|---|---|---|---|
| | 1(c) | 2 | 3 | 4 | 5 | 6(c) | 7(c) | 8 | 9 | 10 | 11 |
| Die C tensile strength | | | | | | | | | | | |
| Stress at failure (MPa) | — | 6.4 | 3.1 | 3.7 | 5.4 | 2.1 | 20.5 | 5.1 | 1.5 | 5.6 | 4.3 |
| % Strain at failure | — | 319 | 252 | 302 | 259 | 222 | 332 | 500 | 434 | 205 | 175 |
| Die C tear str. (N/mm) | — | 18.2 | 12.8 | 8.8 | 12.7 | 10.1 | 77.0 | 15.6 | 9.8 | 22.1 | 16.1 |
| Split tear (ave.) (N/mm) | — | 6.2 | 5.2 | 4.9 | 3.0 | 2.8 | 56.9 | 10.3 | 6.9 | 4.5 | 3.5 |
| Compression set (%) | — | — | 62.8 | 35 | 30.2 | 27.7 | 98.4 | 85.8 | 100.0 | — | 45 |
| Softening point (°C.) | 136 | 149 | 141 | 170 | 163 | 174 | 157 | 130 | 148 | 197 | 180 |

TABLE 4

Physical properties of elastomers prepared in Examples 12–20

|  | Example | | | | | | | | |
| --- | --- | --- | --- | --- | --- | --- | --- | --- | --- |
|  | 12(c) | 13(c) | 14 | 15 | 16(c) | 17(c) | 18 | 19 | 20(c) |
| Die C tensile strength | | | | | | | | | |
| Stress at failure (MPa) | 14.8 | 30.2 | 1.5 | 19.4 | 10.3 | 5.7 | 10.4 | 12.3 | 8.4 |
| % Strain at failure | 508 | 508 | 35 | 510 | 481 | 362 | 340 | 416 | 286 |
| Die C tear (N/mm) | 90.7 | 82.6 | 4.3 | 74.3 | 51.0 | 37.0 | 46.7 | 53.3 | 54.1 |
| Split tear (ave.) (N/mm) | 42.5 | 16.7 | 1.0 | 23.1 | 15.2 | 11.7 | 9.7 | 16.4 | 10.2 |
| Compression set (%) | 49.6 | 54.5 | 53 | 48 | 67.7 | 13.5 | — | 66.7 | — |
| Softening point (°C.) | 196 | 154 | 162 | 180 | 173 | 137 | 191 | 188 | 207 |

The data in Table 1 show that generally improved compression set and softening points were obtained when using amine chain extenders, especially when a crosslinker (extender D) was also added. For example, the elastomers of Examples 2–5, prepared using amine extender A, exhibited generally improved softening points relative to the elastomer of comparison Example 1. The elastomers of Examples 8–11, prepared using amine extender B, exhibited generally improved compression sets relative to the elastomer of comparison Example 7, as well as improved softening points when the cross-linker was also added. The gel times for Examples 2–5 and 8–11 of the invention were all suitable for preparing cast elastomers. Although the elastomer of comparison Example 6 exhibited only slightly inferior properties relative to the elastomers of Examples 4 and 5 of the invention, the gel time was unacceptably fast.

The data in Table 2 show that generally improved compression set and softening points were obtained when using diol chain extender C, especially when the crosslinker was also added. For example, the elastomers of Examples 14–15 exhibited improved softening points relative to the polyol-based system of comparison Example 13. When the crosslinker was also added, the elastomers of Examples 18 and 19 exhibited improved compression set and softening points relative to the polyol-based system of comparison Example 17. Both sets of elastomers according to the invention were comparable in compression set and softening point to the comparison elastomer of Example 12 (prepared without polyol); other physical properties differed significantly. Gel times for the Examples of Table 2 were affected by use of the diol chain extender 1,4-butanediol. However, trends similar to those observed for the Examples of Table 1 can be discerned. In particular, the gel times for Examples 14, 15, 18, and 19 according to the invention were significantly slower than the gel times for comparison Examples 16 and 20.

What is claimed is:

1. A process for the preparation of cast elastomers comprising reacting in an open mold at an isocyanate index of 90 to 110

(a) an organic polyisocyanate;

(b) an aminocrotonate-terminated polyether having a number average molecular weight of from 1200 to 6500 and having the formula

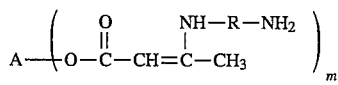

wherein

A is the m-functional group left by the removal of the hydroxyl groups of a polyether polyol having a number average molecular weight of from 1000 to 6000, R is the difunctional residue of an organic diamine having the formula $H_2N—R—NH_2$ wherein said organic diamine is (1) a substituted aromatic diamine in which one or more aromatic ring substituents are situated ortho to the amino groups that give rise to the $—NH_2$ groups of the aminocrotonate-terminated polyethers, or (2) an aromatic diamine other than diamine (b)(1) in which the amino groups giving rise to the $—NH_2$ groups of the aminocrotonate-terminated polyethers have a reduced reactivity which is due primarily to electronic effects rather than steric factors, such that each free $—NH_2$ group of the aminocrotonate-terminated polyether has a sufficiently moderated reactivity toward the organic polyisocyanate, as indicated by a gel time of about 60 to about 300 chain extender or crosslinker), to allow the preparation of an elastomer in an open mold, and m is a number of from 2 to 8; and (c) a chain extending agent having a molecular weight of from 62 to 400, optionally in admixture with 0 to 30% by weight, relative to the chain extending agent, of a crosslinking agent having a molecular weight of from 300 to 500.

2. A process according to claim 1 wherein m is 2 or 3.

3. A process according to claim 1 wherein R is the difunctional residue of a substituted aromatic diamine (b)(1) in which the aromatic ring substituents are $C_1-C_6$ alkyl groups.

4. A process according to claim 1 wherein R is the difunctional residue of 1-methyl-3,5-diethyl-2,4- and/or-2,6-diaminobenzene.

5. A process according to claim 1 wherein R is the difunctional residue of 3,3'-dichloro-4,4'-diaminodiphenylmethane, 3-chloro-4,4'-diaminodiphenylmethane, or 4-(4'-aminobenzyl)cyclohexylamine.

6. A process according to claim 1 wherein 5 to 25% by weight, relative to the chain extending agent, of a crosslinking agent having a molecular weight of from 300 to 500 is used.

7. A process according to claim 1 wherein the crosslinking agent is an ethylene-diamine started polyether of propylene oxide having a molecular weight of about 356.

8. A process according to claim 1 additionally comprising (d) one or more auxiliaries and/or additives.

* * * * *